United States Patent
Lingens et al.

(10) Patent No.: US 8,087,238 B2
(45) Date of Patent: Jan. 3, 2012

(54) METHOD AND DEVICE FOR THE COUNTERPRESSURE-SAFE SEPARATION OUT AND ELIMINATION OF PARTICLES FROM FLUID STREAMS

(75) Inventors: Andreas Lingens, Koenigswinter (DE); Karl-Heinz Breuer, Cologne (DE); Rolf Miebach, Bruehl (DE)

(73) Assignee: Deutz AG, Cologne (DE)

( * ) Notice: Subject to any disclaimer, the term of this patent is extended or adjusted under 35 U.S.C. 154(b) by 582 days.

(21) Appl. No.: 10/572,194

(22) PCT Filed: Sep. 15, 2004

(86) PCT No.: PCT/EP2004/010334
§ 371 (c)(1),
(2), (4) Date: Sep. 21, 2006

(87) PCT Pub. No.: WO2005/033478
PCT Pub. Date: Apr. 14, 2005

(65) Prior Publication Data
US 2007/0193257 A1 Aug. 23, 2007

(30) Foreign Application Priority Data
Sep. 16, 2003 (DE) .................................. 103 43 045

(51) Int. Cl.
*F01N 3/00* (2006.01)
(52) U.S. Cl. ................. 60/295; 60/274; 60/297; 60/311; 55/466; 95/279; 95/428
(58) Field of Classification Search ............... 60/295, 60/297, 311, 274; 55/282.3, 466, DIG. 30; 95/26, 279, 428
See application file for complete search history.

(56) References Cited

U.S. PATENT DOCUMENTS

| | | | | |
|---|---|---|---|---|
| 4,584,003 A | | 4/1986 | Oda et al. | 55/269 |
| 4,875,335 A | * | 10/1989 | Arai et al. | 60/274 |
| 4,902,487 A | * | 2/1990 | Cooper et al. | 423/215.5 |
| 5,253,476 A | * | 10/1993 | Levendis et al. | 60/279 |

(Continued)

FOREIGN PATENT DOCUMENTS
DE 37 09 671 10/1988
(Continued)

OTHER PUBLICATIONS
International Search Report for PCT/EP2004/010334 (3 pages).

*Primary Examiner* — Tu Nguyen
(74) *Attorney, Agent, or Firm* — Davidson, Davidson & Kappel, LLC

(57) ABSTRACT

A method for operating a filter includes forcibly passing a stream of a fluid through a filter wall of the filter from a raw gas side to a clean gas side of the filter so as to separate out particles and particle constituents from the stream, wherein the particles and particle constituents are collected on the raw gas side and performing a regeneration process on the filter during operation of the filter. The regeneration process includes removing particles and particle constituents from the raw gas side of the filter and moving the removed particle constituents to a receiving device disposed on the raw gas side. Alternatively, the filter walls includes a plurality of channels on the raw gas side, each channel closed by a closure wall configured to be partially opened to enable the disposing of the particle constituents.

18 Claims, 2 Drawing Sheets

U.S. PATENT DOCUMENTS

| | | | |
|---|---|---|---|
| 5,390,492 A * | 2/1995 | Levendis | 60/278 |
| 5,426,936 A | 6/1995 | Levendis et al. | 60/278 |
| 5,566,545 A * | 10/1996 | Hijikata et al. | 60/274 |
| 5,634,952 A | 6/1997 | Kasai et al. | 55/302 |
| 5,930,994 A * | 8/1999 | Shimato et al. | 60/274 |
| 5,966,928 A * | 10/1999 | Igarashi | 60/274 |
| 6,010,547 A * | 1/2000 | Jeong et al. | 55/282.3 |
| 6,233,926 B1 | 5/2001 | Bailey et al. | 60/295 |
| 6,375,695 B2 * | 4/2002 | Machida et al. | 55/282.3 |
| 6,718,757 B2 * | 4/2004 | Khair et al. | 60/286 |
| 7,131,263 B1 * | 11/2006 | Styles | 60/278 |
| 7,174,707 B2 * | 2/2007 | Megas et al. | 60/297 |
| 7,462,222 B2 * | 12/2008 | Sellers et al. | 95/279 |
| 2002/0033017 A1 | 3/2002 | Bruggemann et al. | 60/295 |
| 2003/0136117 A1 | 7/2003 | Megas | 60/297 |

FOREIGN PATENT DOCUMENTS

| | | |
|---|---|---|
| DE | 199 10 258 | 9/2000 |
| DE | 100 29 513 | 1/2002 |
| DE | 100 36 597.3 | 2/2002 |
| DE | 10036597 A1 * | 2/2002 |
| EP | 0 308 972 B1 | 3/1989 |
| EP | 0308 525 B1 | 12/1993 |
| JP | 10-220218 | 8/1998 |
| JP | 11336530 | 12/1999 |
| WO | WO 03/086580 | 10/2003 |

* cited by examiner

METHOD AND DEVICE FOR THE COUNTERPRESSURE-SAFE SEPARATION OUT AND ELIMINATION OF PARTICLES FROM FLUID STREAMS

The invention relates to methods for operating a filter, especially a particle filter, for an internal combustion engine, whereby particles in the filter that can be removed by a regeneration process, especially soot, as well as particle constituents that cannot be removed by a regeneration process, especially ashes, are separated out of a fluid stream that enters the filter on the raw gas side and that exits on the clean gas side in that the fluid stream is forcibly passed through a filter wall that separates the raw gas side from the clean gas side and in that the particles are continuously or discontinuously removed from the filter by the regeneration process, whereas the particle constituents are disposed of. Moreover, the invention relates to appropriate devices for this purpose.

BACKGROUND

German patent application DE 100 29 513 A1 discloses a device and a method for increasing the operating time of a particle filter until it becomes necessary to clean non-regenerable particle constituents that are, for example, washed out. In this context, however, the fundamental problem remains that the filter has to be dismantled for the cleaning procedure and then re-installed after the cleaning. This procedure entails quite considerable costs, in addition to which the cleaning procedure calls for maintenance to be carried out in the workshop, thus involving temporary downtimes. In order to keep the costs and downtimes as low as possible, loading with particle constituents at high levels is required and allowed to occur. Here, however, the clogging of the channels causes a relatively high waste gas counterpressure which, among other things, has a detrimental impact on the fuel consumption of the internal combustion engine.

SUMMARY OF THE INVENTION

An object of the present invention is to provide a method and a device with which the removal of non-regenerable particle constituents from a filter is simplified.

This objective is achieved by the first method according to the invention in that the particle constituents are continuously or discontinuously moved into a receiving device that can be connected or that is connected to the raw gas side during the operation of the filter. In this context, the property of incorporation of the particles and of the particle constituents is utilized, a phenomenon that was observed within the scope of the present invention. The particle constituents are at first deposited relatively uniformly on the filter surface together with the particles. During regeneration processes, the combustible particles disappear partially or completely. The particle constituents are left behind. As a result of the fluid stream flowing through the raw gas system, the particle constituents are gradually transported downstream and they ultimately accumulate in the vicinity of stagnation points of the raw gas stream. The receiving device is preferably arranged in the area of such stagnation areas of the raw gas stream. Thus, a filter is not to be operated for such a long time that the non-regenerable particle constituents clog the raw gas side of the filter to such an extent that the latter is almost blocked (with all of the above-mentioned disadvantages) and cleaning cannot be avoided. Instead, during the normal operation of the filter, the particle constituents are moved into a receiving device that is continuously or discontinuously connected to the raw gas side, so that during its entire operating (service) life, the actual filtering surface is only charged at loading rates which, for instance, do not have a negative effect on the waste gas counterpressure. In a first alternative method, the channels on the raw gas side are closed by a closure wall that can be at least partially opened in order to dispose of the particle constituents. In a second alternative method, a separation surface is provided in the filter element where the filter can be opened in order to dispose of the particle constituents. Optionally, a combination of the first and second alternative methods can also be provided. In this context, the particle constituents can likewise be transferred into a receiving device from which they are disposed of or else directly removed, for instance, by suction. Both methods have in common that fact that they prevent the raw gas side of the filter from becoming so clogged with non-regenerable particle constituents that, even after a regeneration process, the active filter surface area of the system is reduced to such an extent that the waste gas counterpressure rises to impermissibly high levels and a demanding cleaning operation becomes necessary involving washing out or even a complete replacement of the filter. As far as the method according to the invention is concerned, the shape, configuration, material and production process of the filter are basically immaterial; all that is significant is that the clean gas side of the filter can be connected or is connected to a receiving device or else that the channels on the raw gas side, which can be of any desired shape, are provided with a closure wall that can be at least partially opened.

In a refinement of the invention, the fluid stream is imparted with a pulsating flow continually, occasionally or as needed. The pulsating flow is initiated by the waste gas stream of the internal combustion engine and can be systematically intensified by resonance states. The pulsation can also be actively triggered, for example, by appropriately actuating the engine brake flap, the variable turbine geometry (VTG) adjustment mechanism or the waste gate valve of a waste gas turbocharger. In particular, the pulsating flow causes the particle constituents to become detached from the filter wall to which they adhere after being filtered out of the fluid stream and causes them to subsequently be moved in the direction of the receiving device or of the closure wall. This migration effect also takes place in a closed system (receiving container) but it is intensified when—as will be elaborated upon below—the stream systematically flows through the system (the receiving container). As an alternative or in addition to the pulsation of the fluid stream, a medium that is under pressure, especially pressurized air, can be fed into the filter on the raw gas side, preferably by means of a nozzle system.

In another embodiment of the invention, a flow exists, especially through the receiving device—as already elaborated upon above—that is to say, a slight waste gas stream or else a directly introduced slight fluid stream is systematically fed through the receiving device. As a result, particularly in conjunction with the pulsating flow, the particle constituents are continuously being moved into the receiving device. In order to remove the particles that are being moved into the receiving device along with the particle constituents, the receiving device is provided with a regenerable filter surface, so that, aside from the particle constituents, the particles that have been moved into the receiving device can be separately removed by means of regeneration. This also increases the collecting capacity of the receiving device. The flow outlet leading out of the receiving device is preferably connected to the clean gas side. In this context, the quantity of particles or particle constituents exiting through the flow outlet is negligibly small. The particle constituents as well as, if applicable, the particles that have accumulated in the receiving device can be eliminated, for instance, by means of a suction device that is preferably connected during routine maintenance in the workshop. However, it is also provided for the suction procedure to be performed on site, for example, employing an appropriate (industrial) vacuum cleaner. In such a case, the filter bags of the vacuum cleaner have to be disposed of in accordance with any regulations that might apply. Here, the filter, together with the housing and any accessories, remains on the internal combustion engine or in the vehicle in question, so that the cleaning work is considerably reduced in comparison to conventional systems.

In another embodiment, the disposal of the particle constituents can be done in such a way that the outlet leading out of the clean gas side of the filter is closed and the fluid stream and/or a medium that is under pressure flows—optionally pulsating—through the raw gas side of the filter. With this method, (the particles and) the particle constituents are eliminated especially meticulously and thoroughly from the filter and from the receiving device to which, in turn, a suitable suction device can be connected. This disposal procedure is preferably carried out during workshop maintenance but it can also be performed during normal operation of the internal combustion engine without the connection of a suction device.

The filter, optionally including the regenerable filter surface of the receiving device, is regenerated by feeding nitrogen dioxide into the filter, so that continuous (controlled) oxidation of soot occurs. It goes without saying that the filter can also be discontinuously regenerated thermally, for example, by means of a burner or by means of an (electric) heater integrated into the filter.

Of course, the filters configured according to the method optionally have all of the devices that are needed for the above-mentioned refinements of the basic method.

BRIEF DESCRIPTION OF THE DRAWINGS

Additional advantageous embodiments of the invention can be gleaned from the description of the drawing where the embodiments depicted in the figures are described.

The following is shown.

DETAILED DESCRIPTION

Figure 1:
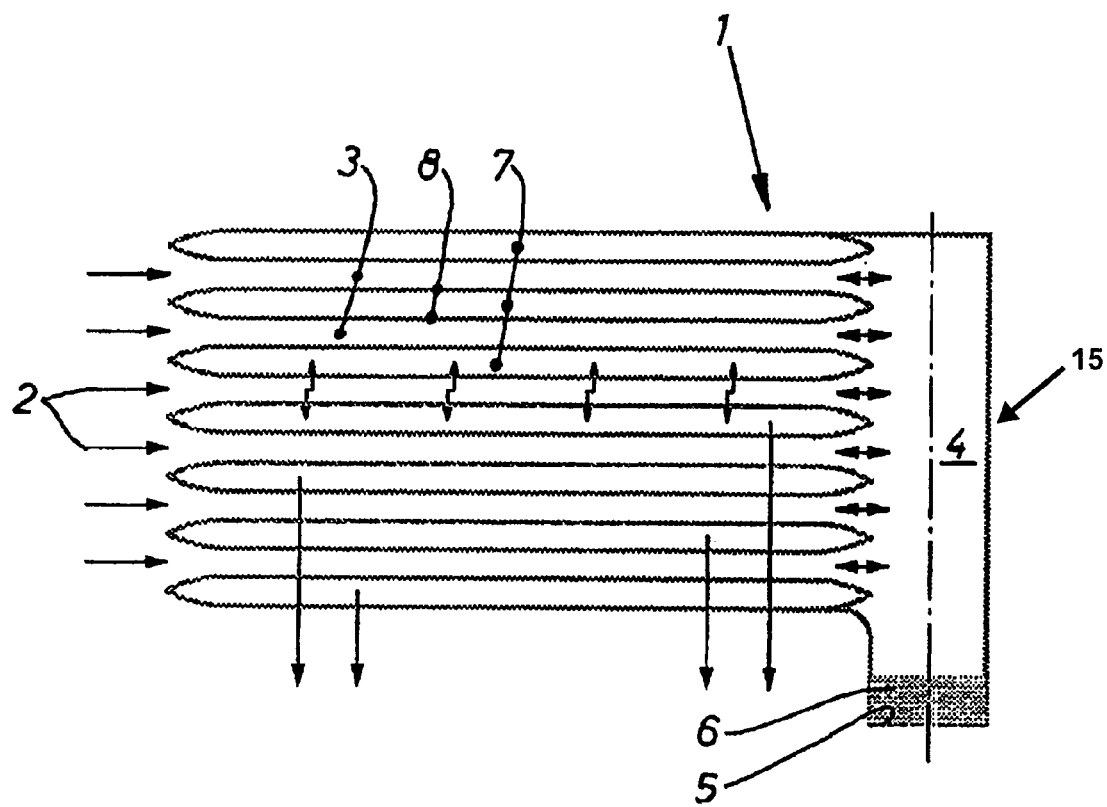
FIG. 1—a first embodiment of an appertaining filter.

The filter 1 shown in FIG. 1 is employed to clean the waste gases of particularly a self-igniting internal combustion engine, said waste gases containing particles, especially soot particles, as well as particle constituents, especially ashes. In particular, the ashes are burned constituents of the lubricating oil of the internal combustion engine and, in contrast to the particles, cannot be separated out from the filter 1, particularly a soot filter, by means of thermal or other regeneration methods. In the filter 1, the particles as well as the particle constituents are removed from the waste gas, whose direction of flow 2 into the filter 1 on the inlet side is indicated by the arrows. This is done in that the filter 1 is surrounded by a housing having an inlet that, in an inlet area, feeds the waste gases on the raw gas side into raw gas channels 3. The raw gas channels 3 are open towards a collecting chamber 4 located in the filter 1, although the collecting chamber 4 is only connected to a receiving device 5 configured as a collecting container. The collecting chamber 4 is formed by a closure wall 15 that is at least partially openable at the receiving device 5. The collecting chamber 4 as well as the receiving device 5 are tightly sealed vis-a-vis the environment (only in the receiving device 5 can an opening—which will be elaborated upon below—be created for purposes of attaining a slight flow). In this manner, the waste gas is forcibly passed through the filter wall 8 or filter walls 8 that separate a raw gas channel 3 from a clean gas channel 7. The clean gas channels 7 open up into an outlet area of the housing that is separate from the inlet area, said outlet area being connected to an outlet in the housing wall. In the embodiment shown in FIG. 1, the raw gas channels 3 as well as the clean gas channels 7 are designed as flat channels that are arranged, for example, at an approximately right angle relative to each other or else on top of each other in an alternating manner, so that a clearly visible filter structure is obtained. While the stream is passing through the filter 1 or, to put it more precisely, is penetrating the filter walls 8, the particles as well as the particle constituents are filtered out of the waste gas and remain in the raw gas channels 3, normally adhering to the place where the waste gas penetrates the filter wall 8. Then, by means of a continuous or discontinuous regeneration process, the particles are removed without leaving residues, whereas the particle constituents at first remain at that particular place on the filter wall. Especially as a result of the pulsation of the waste gas stream, which can be intentionally caused or intensified if so desired, the particle constituents break loose from the filter wall 8 and move in the direction of the collecting chamber 4 and accumulate in a receiving device 5 in the form of an agglomerate 6 of particle constituents. This movement is enhanced or intensified if the above-mentioned opening in the receiving device 5 brings about a slight flow velocity in this direction.

Figure 2:
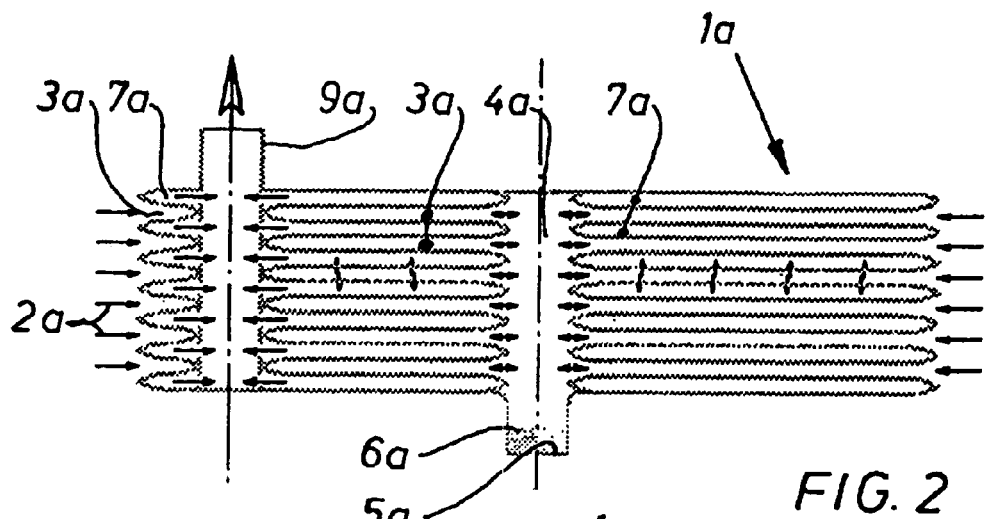
FIG. 2, 2a—a second embodiment of an appertaining filter.
Figure 2A:
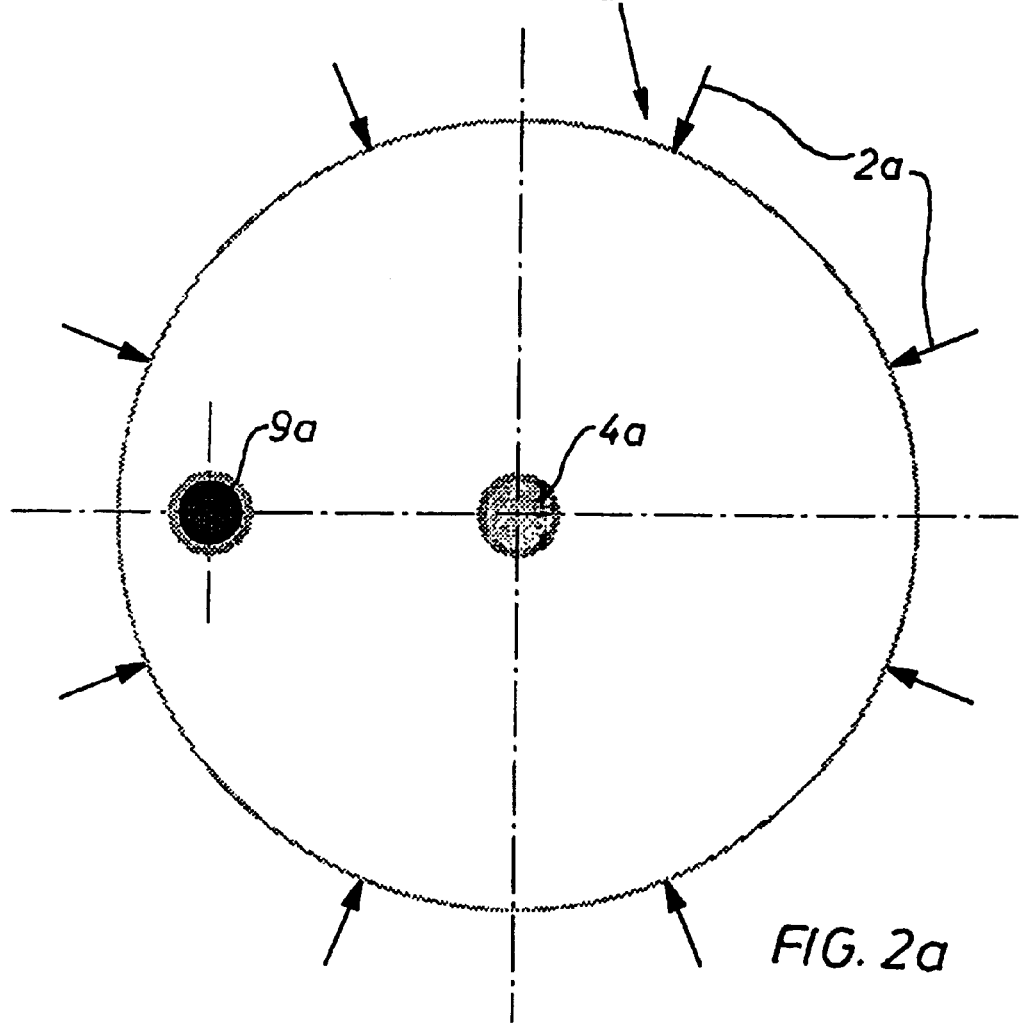

The embodiment according to the section depicted in FIG. 2 and the top view in FIG. 2a show a filter 1a which, in principle, functions in the same manner as the previously described filter 1 although it is constructed differently. Here, the filter 1a is configured in the form of a cylinder and the collecting chamber 4a is preferably arranged in the center axis of the cylinder. The outlet area in this embodiment is formed by a collecting channel 9a that in principle can be arranged anywhere in the filter 1a. The clean gas channels 7a are open towards this collecting channel 9a, while the raw gas channels 3a are open towards the collecting chamber 4a. This filter 1a is placed into a housing in which the inlet area leading into the raw gas channel 3a surrounds the filter 1a like a ring. The outlet area with its centered outlet leading out of the housing is connected to the collecting channel 9a. The particle constituents collect as an agglomerate 6a in the receiving device 5a. Within the scope of the invention, the configuration of the filter 1, 1a shown in each of the embodiments can also have any other desired design (oval, conical, rectangular, etc.).

What is claimed is:

1. A method for operating a filter including a plurality of filter walls forming a plurality of channels which are closed by a closure wall configured to be partially opened, the method comprising:

forcibly passing a stream of a fluid through the filter walls of the filter from a raw gas side to a clean gas side of the filter so as to separate out particles and particle constituents from the stream, wherein the particles and particle constituents are collected on the raw gas side; and performing a regeneration process on the filter during operation of the filter to remove particles from the filter wall and disposing of the particle constituents not removed from the raw gas side of the filter by the regeneration process by flowing fluid from the raw gas side to the clean side and forcing the particle constituents through the channels toward the closure wall.

2. A method for operating a filter, the method comprising:

forcibly passing a stream of a fluid through a filter wall of the filter from a raw gas side to a clean gas side of the filter so as to separate out particles and particle constituents from the stream, wherein the particles and particle constituents are collected by the filter wall on the raw gas side; and performing a regeneration process on the filter during operation of the filter to remove particles from the filter wall and moving particle constituents not removed from the raw gas side of the filter by the regeneration process to a receiving device disposed downstream of at least a portion of the filter by forcibly passing a stream of fluid from the raw gas side through the filter so that the particle constituents are carried by the fluid to the receiving device.

3. The method as recited in claim 2, wherein the particles include soot and the particle constituents includes ashes.

4. The method as recited in claim 2, wherein the regeneration process is performed continuously during operation of the filter.

5. The method as recited in claim 2, wherein the moving of the particle constituents is performed continuously during operation of the filter.

6. The method as recited in claim 2, wherein the fluid is a gas.

7. The method as recited in claim 2, wherein the filter is a particle filter for an internal combustion engine.

8. The method as recited in claim 2, wherein that the fluid stream forcibly passed through the filter so that the particle constituents are carried by the fluid to the receiving device is imparted with a pulsating flow to move the removed particle constituents to the receiving device.

9. The method as recited in claim 2, wherein a portion of the fluid stream flows through the receiving device.

10. The method as recited in claim 2, wherein the receiving device includes a regenerable filter surface.

11. The method as recited in claim 2, wherein the forcibly passing a stream of fluid through the filter so that the particle constituents are carried by the fluid to the receiving device includes a step of passing a medium that moves the removed particle constituents to the receiving device through the receiving device and out of a flow outlet leading out of the receiving device and into the clean gas side.

12. The method as recited in claim 2, wherein the forcibly passing a stream of fluid through the filter so that the particle constituents are carried by the fluid to the receiving device includes closing an outlet leading out of the clean gas side of the filter and passing a medium that moves the removed particle constituents to the receiving device through the receiving device and out of a flow outlet leading out of the receiving device.

13. The method as recited in claim 2, wherein the regeneration process includes feeding nitrogen dioxide into the filter.

14. The method as recited in claim 2, wherein the regeneration process is performed thermally.

15. The method as recited in claim 2, wherein the forcibly passing a stream of fluid through the filter so that the particle constituents are carried by the fluid to the receiving device includes feeding a pressurized medium into the filter on the raw gas side to move the removed particle constituents to the receiving device.

16. The method as recited in claim 15, wherein the pressurized medium is pressurized air.

17. A filter comprising:

a filter wall dividing a clean gas side and a raw gas side of the filter and configured to separate out particles and particle constituents from a stream of fluid passing flowing from the raw gas side through the filter wall and to enable the particles to be removed in a regeneration process; and a receiving device located downstream of at least a portion of the filter wall configured to receive a flow of the fluid from the raw gas side of the filter therethrough and to receive and hold the particle constituents, the filter wall and receiving device being arranged such that the stream of fluid passing through the filter wall from the raw gas side forces the particle constituents into the receiving device.

18. The filter as recited in claim 17, wherein the receiving device is removably connectable to the filter wall.

* * * * *